March 31, 1964    R. W. TACCONE    3,126,592
MACHINE FOR MAKING THREADED MOLDS
Filed May 23, 1960
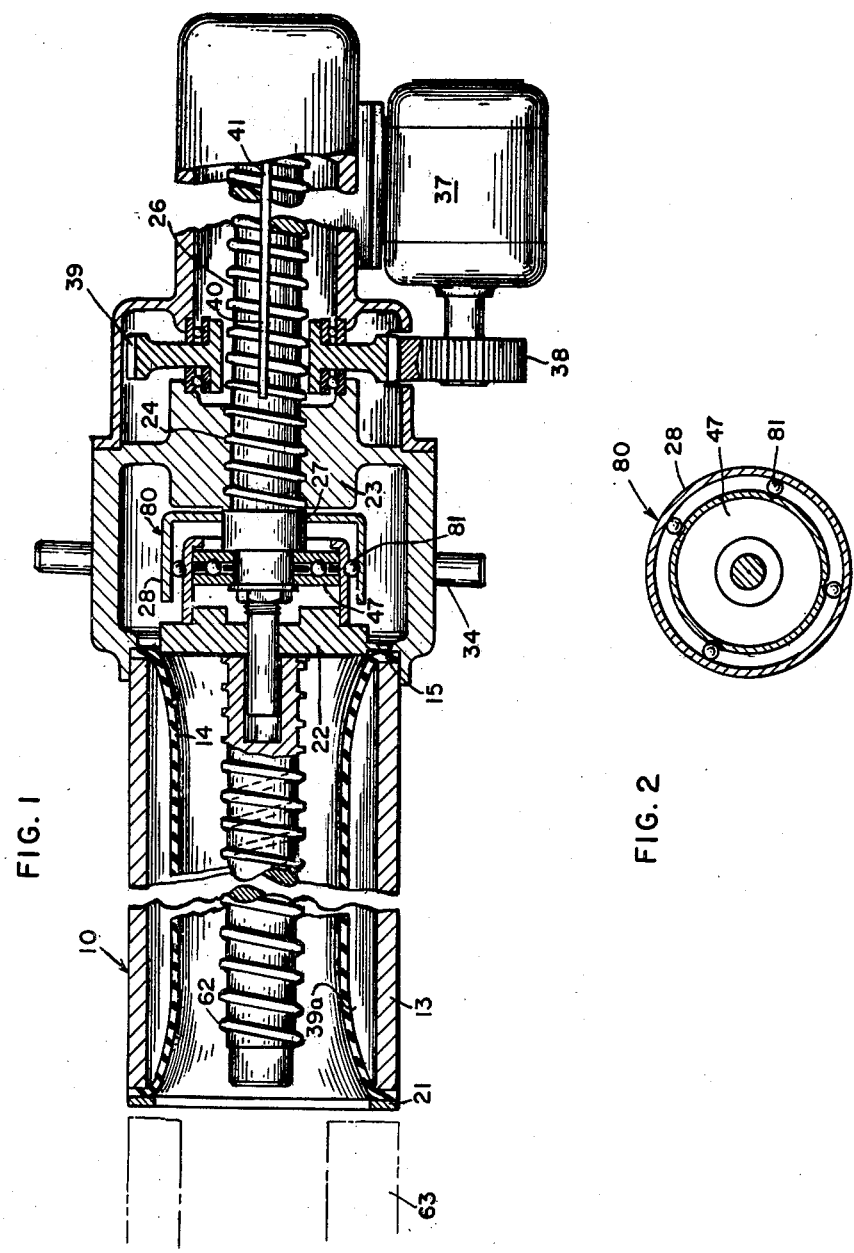
INVENTOR.
RUSSELL W. TACCONE
BY
Charles L. Lowercheck

United States Patent Office 3,126,592
Patented Mar. 31, 1964

3,126,592
MACHINE FOR MAKING THREADED MOLDS
Russell W. Taccone, Erie, Pa., assignor to Taccone Corporation, Erie, Pa., a corporation of Pennsylvania
Filed May 23, 1960, Ser. No. 30,986
4 Claims. (Cl. 22—14)

This invention relates to machines for making molds and, more particularly, to machines for making molds for centrifugal castings and the like.

This application is a continuation in part of patent application, Serial No. 780,145, filed December 12, 1958, which issued as Patent No. 2,937,421 on May 24, 1960.

In the manufacture of cylinder sleeves for internal combustion engines wherein an iron sleeve is cast into an aluminum engine block, it has been proposed to form a thread on the outside of the cylinder sleeve in order to give the aluminum metal a better bond to the cylinder. In order to make molds for such a casting, it is necessary to make a mold with a threaded inside. The improved machine herein constitutes a solution to this important problem.

It is, accordingly, an object of the present invention to provide a machine for manufacturing molds for cylindrical castings having a threaded member on the outside thereof.

Another object of the invention is to provide an improved machine for making molds.

A further object of the invention is to provide a machine for making molds which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a longitudinal cross sectional view of a machine according to the invention;

FIG. 2 is an enlarged view of the clutching mechanism.

Now with more particular reference to the drawing, a molding machine 10 is adapted to be supported in gimbals similar to the manner in which the machine shown in the parent application is supported in gimbals and a suitable arrangement for supplying compressed air to the diaphragm and to swing the mold will be provided as in the parent application.

The molding machine 10 is provided with a loading hopper and a sand sump similar to that in the parent application. A diaphragm containing cylinder 13 with a diaphragm 14 therein is provided. The diaphragm 14 is a tubular flexible rubber sleeve whose one end 15 is attached to one end of the cylinder 13 and whose other end 21 is attached to the other end of the cylinder 13.

The end of the cylinder 13 will be provided with a cover such as that in the parent application. The cover serves to hold the sand in position in the diaphragm 14 during the time that pressure is applied thereto so that a flat end is provided on the sand mold. A head 23 has a threaded opening 24 therein which receives a threaded lead screw 26. The lead screw 26 is attached at 27 to an outer clutch member 28. The lead screw 26 will move inwardly or outwardly of the cylinder 13, depending upon the rotation of a motor 37 which is connected by a gear train 38 to a gear 39.

A source of compressed air is provided to inject air between the cylinder 13 and the diaphragm 14. The diaphragm 14 and the cylinder 13 are swingably supported on gimbals 34 which are swingably mounted in bearings and are swung from the position wherein the cylinder 13 is aligned with a loading chute as in the parent application to the position wherein it is aligned with a flask 63 which is similar to the flask in the parent application.

An internal bearing 47 is provided inside an inner clutch member 81 which is a thrust member which applies the thrust from the lead screw 26 to a pattern 62.

When the compressed air is introduced through a pipe to the space between the diaphragm 14 and the cylinder 13, sand having been introduced into the cylinder 13, the sand will be compressed around the pattern 62. A space 39a between the inner periphery of the cylinder 13 and the diaphragm 14 is connected to a suitable output pipe as in the parent application which, in turn, communicates with an evacuating pump and a compressed air source. Therefore, the evacuating pump may be connected to the space 39a through a suitable valve mechanism by way of suitable piping which communicates therewith through an aperture.

The diaphragm 14 will be drawn into tight engagement with the inner periphery of the cylinder 13 when the evacuating pump is turned on. Then after the sand is put in place around the pattern 62 and pressure is applied inside the diaphragm 14 to inflate the diaphragm, the diaphragm 14 will compress the sand around the pattern 62. Then when the air from around the diaphragm 14 is exhausted and a vacuum is applied through the pump, the diaphragm 14 will be again drawn away from the sand, leaving the compressed sand disposed around the pattern 62. If a suitable resilient diaphragm is used, the evacuating pump could be dispensed with; however, in this case, the speed of production of the machine would be reduced if the evacuating pump were eliminated.

The pattern 62 has a flange 22 on the inner end thereof which engages the sand as it is pushed into the flask 63.

When the mold cylinder 13 is swung to the position shown in line with the flask 63, the mold cylinder 13 will be in alignment with the flask 63 and the motor 37 will be started to drive the lead screw 26 toward the sand. This will cause the flange 22 to force the sand out of the cylinder 13 and into the flask 63. A suitable strike off member such as that in the parent application will be provided to smooth the outside surface of the sand.

During this operation, the clutch will be released so that the outside clutch member 28 will be running independent of the balls 81 and, therefore, the pattern 62 will not rotate with the screw 26. When the sand around the pattern 62 is completely in the flask 63, the motor 37 will be reversed so that the lead screw 26 will be run backward. Simultaneously, a one-way clutch 80 will be engaged with the balls 81 so that the pattern 62 will be rotated at the same rate that the lead screw 26 is rotated. Therefore, the pattern 62 will back out of the threads formed inside the sand without disturbing them. A ratchet arrangement or other suitable one way drive could be substituted for the clutch. The clutch 80 is shown by way of illustration only and could be any one of the many clutches used for connecting two rotating members; however, an electrical clutch is preferable because of the ease in connecting wiring inside of the housing shown. A mechanical clutch, however, or other type of clutch could be used within the scope of the invention.

The threads on the pattern 62 will have the same pitch as the threads on the lead screw 26 so that they will not be disturbed when the pattern 62 is being withdrawn and since the gear 39 is keyed by a key 40 in a slot 41 in the lead screw 26, the lead screw 26 will be driven by the gear 39.

From the foregoing description, it will be seen that the machine described herein can be used to provide precision molds for use in centrifugally casting tubular members having threads on the outside thereof.

The foregoing specification sets forth the invention in its preferred practical forms but the structure shown is capable of modification within a range of equivalents without departing from the invention which is to be understood is broadly novel as is commensurate with the appended claims.

I claim:

1. A machine for producing a mold for casting a threaded article comprising a threaded pattern, a hollow member around said pattern, means to pack mold forming material around said pattern, means to rotate said pattern and to simultaneously withdraw said pattern from said packed mold forming material, said means to pack said material comprising a tubular flexible diaphragm having its ends attached to the ends of said hollow member, means to admit mold forming material from a source thereof into the space between said pattern and said diaphragm, said means to withdraw said pattern from said material comprising a lead screw, means to rotate said lead screw, said pattern being attached to said lead screw to move axially non-rotatably therewith, and means to selectively connect said lead screw to said pattern to rotate therewith during its axial movement.

2. The machine recited in claim 1 wherein said means to pack said material comprises a flexible diaphragm in said hollow member and means to compress a fluid against said diaphragm on the side thereof remote from said material.

3. The machine recited in claim 2 wherein means is provided to reduce the pressure on the side of said diaphragm remote from said material whereby said diaphragm is moved out of engagement with said material.

4. A machine for making molds comprising a hollow member open at one end, a tubular diaphragm disposed in said hollow member and having its ends attached to said hollow member to form an enclosure to receive a fluid between said diaphragm and said hollow member, a cylindrical pattern having a spiral groove in the outside surface thereof within said tubular diaphragm, said diaphragm being adapted to receive sand around said pattern, means to move said pattern with sand packed therearound into a flask, means to withdraw said pattern from said sand in said flask, and means to simultaneously rotate said pattern as it is being withdrawn from said sand and to the end of said hollow member remote from said first mentioned end whereby an internally threaded mold is produced.

References Cited in the file of this patent
UNITED STATES PATENTS

| | | |
|---|---|---|
| 931,760 | Hattersley | Aug. 24, 1909 |
| 1,544,056 | Dimick | June 30, 1925 |
| 2,864,136 | Taccone | Dec. 16, 1958 |
| 2,937,421 | Taccone | May 24, 1960 |